United States Patent
Smith, III

(10) Patent No.: US 6,173,742 B1
(45) Date of Patent: Jan. 16, 2001

(54) UNDERSEA HYDRAULIC COUPLING WITH AXIAL PRELOADING

(75) Inventor: Robert E. Smith, III, Missouri City, TX (US)

(73) Assignee: National Coupling Company Inc., Stafford, TX (US)

(*) Notice: Under 35 U.S.C. 154(b), the term of this patent shall be extended for 960 days.

(21) Appl. No.: 08/533,305

(22) Filed: Sep. 25, 1995

Related U.S. Application Data

(63) Continuation of application No. 08/308,116, filed on Sep. 16, 1994, now abandoned.

(51) Int. Cl.[7] .................................................. F16L 29/02
(52) U.S. Cl. ...................................... 137/614.04; 285/361
(58) Field of Search ...................... 285/361; 137/614.04

(56) References Cited

U.S. PATENT DOCUMENTS

| | | | |
|---|---|---|---|
| Re. 25,920 | 11/1965 | Moen | 137/454.2 |
| 1,913,982 | 6/1933 | Fox . | |
| 1,937,982 | * 12/1933 | Rudolph | 285/361 X |
| 1,944,124 | 1/1934 | Goodman | 285/175 |
| 2,111,859 | * 3/1938 | Kennedy | 285/361 X |
| 2,119,331 | * 5/1938 | Jensen | 285/361 X |
| 2,129,704 | 9/1938 | Meyer | 284/19 |
| 2,265,267 | 12/1941 | Cowles | 284/19 |
| 2,457,251 | 12/1948 | Main, Jr. | 285/19 |
| 2,471,237 | 5/1949 | Pasturczak | 284/19 |
| 2,598,009 | 5/1952 | Peeps | 284/19 |
| 2,730,380 | 1/1956 | Espy et al. | 284/19 |
| 2,757,684 | 8/1956 | Ulrich | 137/515 |
| 2,966,371 | 12/1960 | Bruning | 284/19 |
| 3,112,766 | 12/1963 | Zeliznak et al. | 137/614.05 |
| 3,217,746 | 11/1965 | Voisine | 137/614.04 |
| 3,527,480 | 9/1970 | Larson | 285/85 |
| 3,625,251 | 12/1971 | Nelson | 137/614.04 |
| 3,637,223 | 1/1972 | Weber | 277/205 |
| 3,727,952 | 4/1973 | Richardson | 285/101 |
| 3,759,552 | 9/1973 | Levinsohn et al. | 285/175 |
| 4,086,939 | 5/1978 | Wilcox et al. | 137/614.03 |
| 4,089,549 | 5/1978 | Vyse et al. | 285/137 |
| 4,222,411 | 9/1980 | Herzan et al. | 137/614.04 |
| 4,253,683 | 3/1981 | Jentsch et al. | 285/13 |
| 4,396,035 | 8/1983 | Maples | 137/539 |
| 4,426,104 | 1/1984 | Hazelrigg | 285/26 |
| 4,453,566 | 6/1984 | Henderson, Jr. et al. | 137/614.02 |
| 4,460,156 | 7/1984 | Hazelrigg et al. | 251/149.3 |
| 4,496,162 | 1/1985 | McEver et al. | 277/9.5 |
| 4,552,333 | 11/1985 | Niemi | 251/149.9 |
| 4,637,470 | 1/1987 | Weathers et al. | 166/344 |
| 4,666,187 | 5/1987 | Koot | 285/24 |
| 4,694,859 | 9/1987 | Smith, III | 137/614.04 |
| 4,709,726 | 12/1987 | Fitzgibbons | 137/614.04 |
| 4,745,948 | 5/1988 | Wilcox et al. | 137/614.05 |
| 4,754,780 | 7/1988 | Smith, III | 137/614.04 |
| 4,768,538 | 9/1988 | Mintz et al. | 137/15 |
| 4,813,454 | 3/1989 | Smith, III | 137/614.04 |
| 4,817,668 | 4/1989 | Smith, III | 137/614.04 |
| 4,832,080 | 5/1989 | Smith, III | 137/614.04 |
| 4,834,139 | 5/1989 | Fitzgibbons | 137/614.04 |
| 4,858,648 | 8/1989 | Smith, III | 137/614.04 |
| 4,884,584 | 12/1989 | Smith, III | 137/614.04 |
| 4,886,301 | 12/1989 | Remsburg | 285/39 |

(List continued on next page.)

Primary Examiner—John Fox
(74) Attorney, Agent, or Firm—Fulbright & Jaworski

(57) ABSTRACT

A hydraulic coupling for use in undersea drilling and production operations is disclosed, having a male member with radially extending projections or fins configured to be received in a female member having corresponding grooves in its receiving chamber. Relative rotation of the members urges the male member inwardly and preferably compresses axially a metal seal between the leading face of the male member and an internal shoulder. This preloads the seal before the coupling is pressured up with hydraulic fluid. The rotation of the male member may be done manually or by remote actuation.

14 Claims, 3 Drawing Sheets

U.S. PATENT DOCUMENTS

| | | | |
|---|---|---|---|
| 4,900,071 | 2/1990 | Smith, III | 285/379 |
| 4,915,419 | 4/1990 | Smith, III | 285/26 |
| 4,924,909 | 5/1990 | Wilcox | 137/614.05 |
| 5,014,743 | 5/1991 | Makishima | 137/614.03 |
| 5,015,016 | 5/1991 | Smith, III | 285/108 |
| 5,029,613 | 7/1991 | Smith, III | 137/614.04 |
| 5,052,439 | 10/1991 | Smith, III | 137/614.04 |
| 5,099,882 | 3/1992 | Smith, III | 137/614.04 |
| 5,339,861 | 8/1994 | Smith, III | 137/614.04 |

* cited by examiner

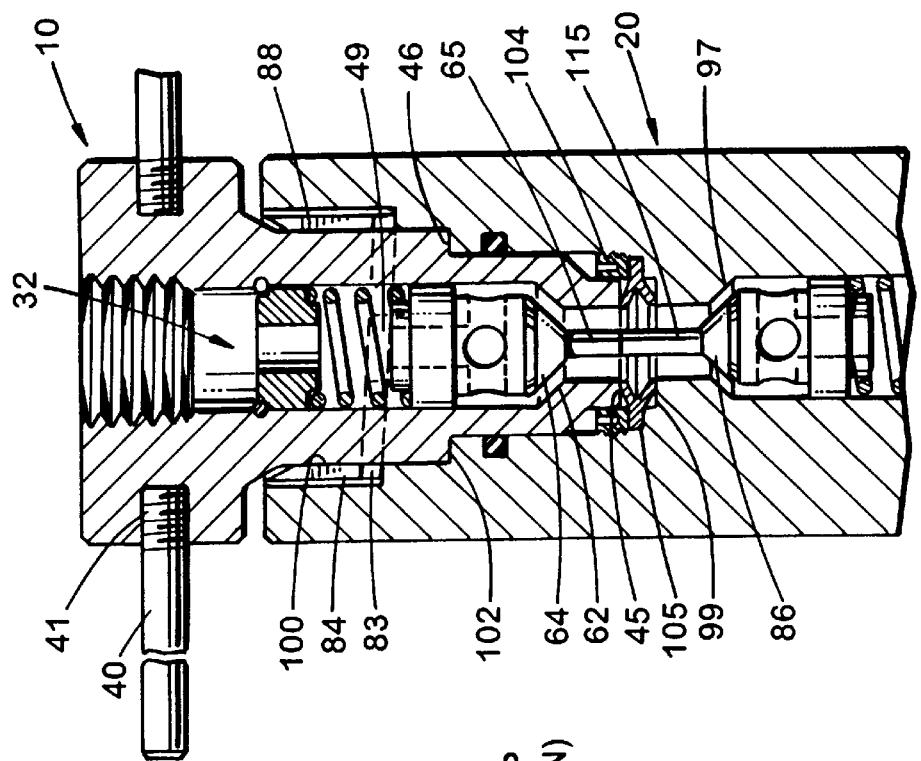
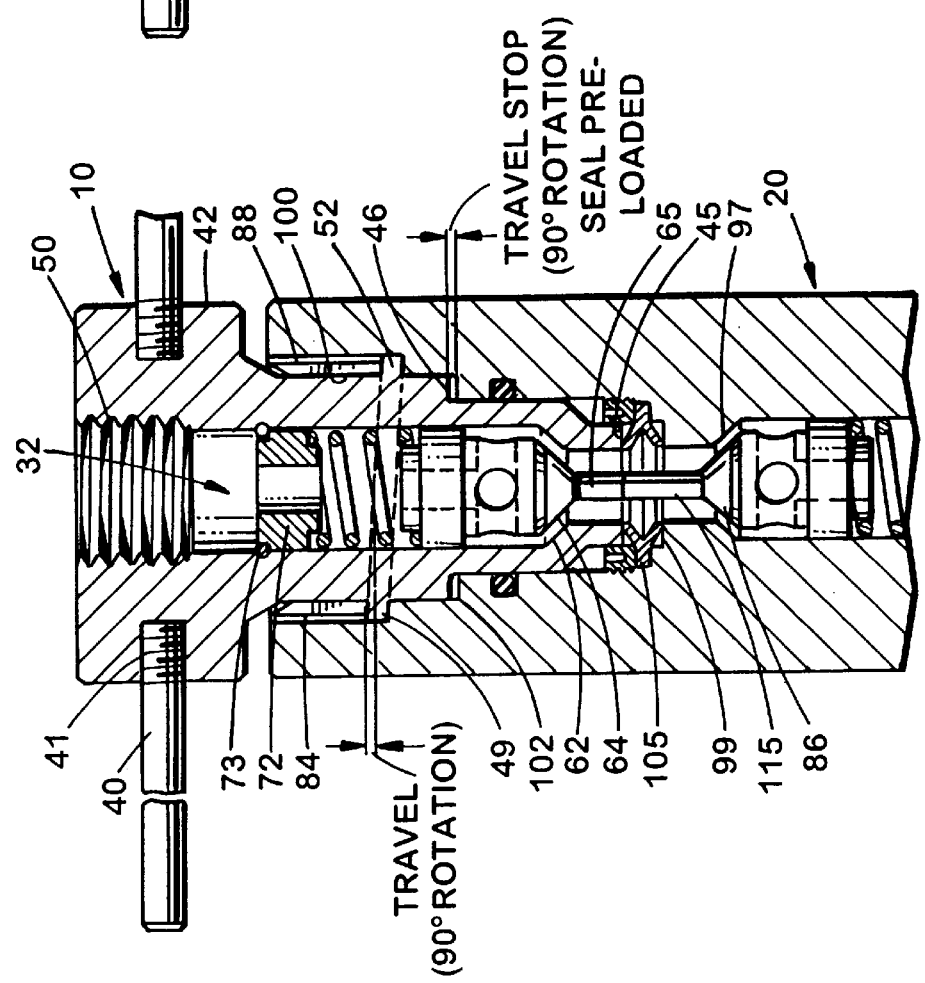

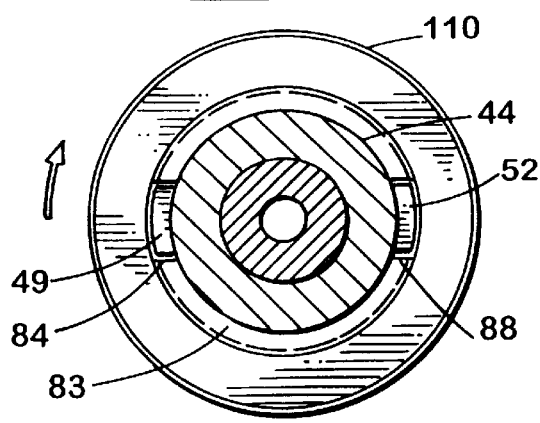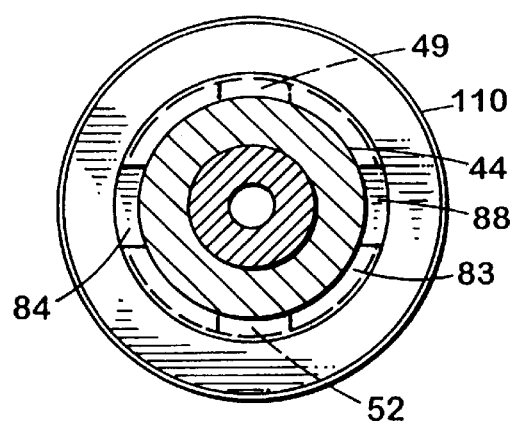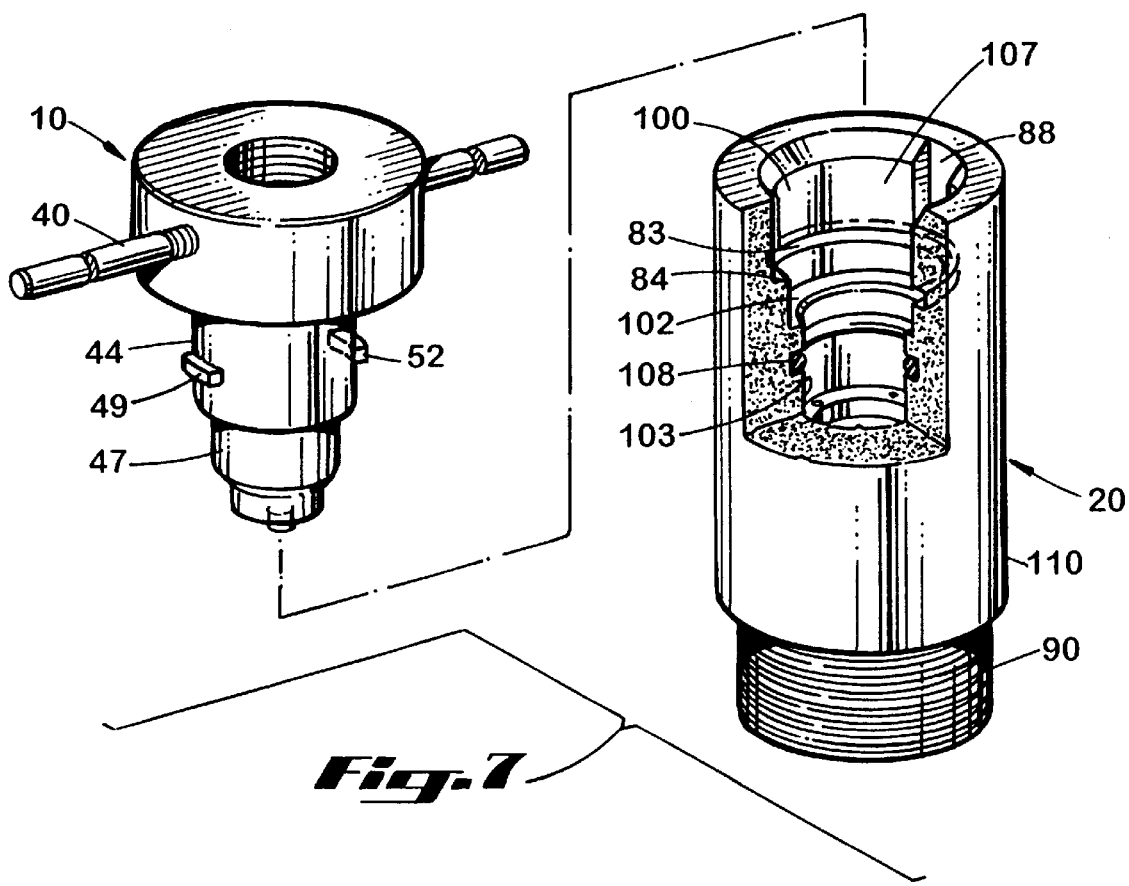

UNDERSEA HYDRAULIC COUPLING WITH AXIAL PRELOADING

This application is a continuation of Ser. No. 08/308,116 filed Sep. 16, 1994, abn.

BACKGROUND OF THE INVENTION

1. FIELD OF THE INVENTION

This invention relates in general to hydraulic couplings, and specifically to hydraulic couplings used in undersea drilling and production applications. More particularly, this invention involves a hydraulic coupling configured to urge the members together and axially compress a ring-shaped seal in the female member upon connection of the members.

2. DESCRIPTION OF THE RELATED ART

Subsea hydraulic couplings are old in the art. The couplings generally consist of a male member and a female member with sealed fluid passageways connected therebetween. The female member generally is a cylindrical body with a relatively large diameter longitudinal bore at one end and a relatively small diameter longitudinal bore at the other. The small bore facilitates connections to hydraulic lines, while the large bore seals and slidingly engages the male member of the coupling. The male member includes a cylindrical portion at one end having an outer diameter approximately equal to the diameter of the large bore of the female member of the coupling. The male member also includes a connection at its other end to facilitate connection to hydraulic lines. When the cylindrical portion of the male member is inserted into the large bore of the female member, according to various embodiments of the device, fluid flow is established between the male and female members.

In the past, various types of seals have been used between the male and female members of the coupling. For example, U.S. Pat. No. 4,694,859 discloses an undersea hydraulic coupling with a hollow, ring-shaped metal seal that is pressure energized to seal radially between the female member and the outer surface of the male member. Similarly, in U.S. Pat. No. 4,754,470 two metal seals are positioned between the circumference of the male member and central bore of the female member.

Another type of seal in an undersea hydraulic coupling is disclosed in U.S. Pat. No. 4,637,470. This patent shows a seal that is V-shaped in cross section and is compressed axially between the end or leading face of the male member and a shoulder in the bore of the female member. Belleville washers are used to provide a force between the members to maintain the seals in tight contact. This force is necessary to avoid leakage of hydraulic fluid if the members are slightly separated.

During use of hydraulic couplings, fluid pressure is exerted between the male and female members in such a way as to tend to separate them. The male and female members are typically attached to opposing manifold plates which are held together by bolts or hydraulic members attached to the plates. The male members are commonly attached to one plate while the female members are attached to an opposing plate so as to face the male members and align with them. Typically, groups of 10 or more coupling members are attached to each manifold plate. The manifold plates tend to warp or rock when coupling members are pressured up, thus causing the coupling members to separate slightly.

In the prior art, various approaches have been suggested to secure the male and female members of the coupling together. For example, lock sleeves have been used in so-called quick release couplings. In those type of couplings, a sleeve is pulled back from one member of the coupling to lock or release the coupling members together. Typically a ball and groove configuration is used.

Another approach, as disclosed in U.S. Pat. No. 4,637,470, uses Belleville washers to provide a force urging the numbers together.

Still another approach is that of U.S. Pat. No. 4,915,419 to Robert E. Smith III. This patent shows an apparatus for locking together simultaneously one or more male and female coupling members using a sliding lock plate. In the locked position, passages in the lock plate are configured to engage the circumference of the male and female coupling members and restrict axial movement of the members.

SUMMARY OF THE INVENTION

The present invention resides in a hydraulic coupling of the foregoing type, including male and female members for fluid communication therebetween and a ring-shaped seal for sealing the junction between the coupling members. To lock the members together, and ensure that the seal is axially compressed to form a fluid tight seal between the members, the male member is cammed axially inwardly into the female member bore by rotation of the male member with respect to the female member. At least two fins or projections extend radially outwardly from the body of the male member and are captured in a groove in the female member bore which, during relative rotation of the members, urges the male member inwardly and axially compresses a ring-shaped seal in the bore. Preferably, the seal is a metal seal with a V-shaped cross section which is axially compressible between the face of the male member and a shoulder in the bore of the female member.

The male member contacts the seal before it is rotated, and then as it is rotated approximately 90 degrees, the male is brought further into the female member bore to slightly press against the metal seal and compress it. The male member may be rotated manually or actuated by mechanical means such as a cam.

BRIEF DESCRIPTION OF THE DRAWINGS

FIG. 3 is a section view of a male member partially inserted into the female member of a coupling, before it is rotated to compress the seal.

FIG. 4 is a section view of a male member fully inserted into the female member with the seal compressed according to a preferred embodiment of the present invention.

FIG. 5 is a cross-section view of the coupling shown in FIG. 3 before the camming surfaces are rotated.

FIG. 6 is a cross-section view of the coupling shown in FIG. 4 after the camming surfaces are rotated.

FIG. 7 is a perspective view of the male and female members of the coupling.

DETAILED DESCRIPTION OF THE PREFERRED EMBODIMENTS

Figure 1:
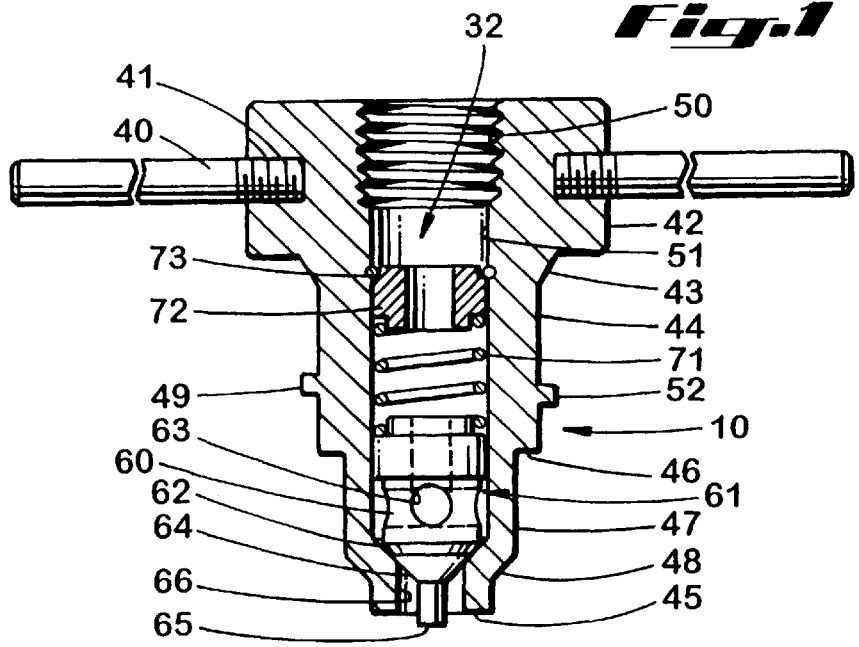
FIG. 1 is a section view of a male member of a coupling according to a preferred embodiment of the present invention.

The coupling of the present invention includes a male member 10 and a female member 20. As shown in FIG. 1, the male member 10 comprises a handle or flange 42, a tapered shoulder 43 and a cylindrical probe wall 44. In a preferred embodiment, the probe wall further includes a first shoulder 46, a reduced diameter probe wall 47, a second tapered shoulder 48 and a leading face 45.

The male member includes an internal bore 32 extending therethrough. At one end of the bore is a threaded passage 50 for connection to a hydraulic line. Adjacent and inboard of the threaded section is a cylindrical passageway 51 extending longitudinally within the male member body and terminating at valve seat 62 which is an inclined shoulder. Adjacent the valve seat is cylindrical passage 66 having a reduced diameter.

As shown in FIG. 1, valve assembly 61 is slidably received within the central bore 32 of the male member. The various parts of the valve assembly of the male member are valve head 60 with apertures 63 extending therethrough, and valve face 64 which is conical in shape and dimensioned to seat within the valve seat 62 at the end of the male member bore. Extending from the valve face 64 is a valve actuator 65 which is cylindrical in shape and extends along the longitudinal axis of the male member. The valve actuator 65 is located at the apex of the conical valve face. Helical valve spring 71 is used to urge the valve face 64 into a closed position against valve seat 62. The helical valve spring is located within the cylindrical passageway 51 and anchored at hollow spring collar 72 which is held in place by collar clip at the inner surface of the cylindrical passageway 51. The opposite end of the helical valve spring 71 is in contact with the valve assembly, urging it into a closed position against the valve seat.

Extending radially outwardly form the probe wall 44 are projections or fins 49 and 52. In a preferred embodiment, two projections or fins are used. However, as will be apparent to those skilled in the art, additional projections or fins may be used to cam the male member axially into the female member bore or receiving chamber, as will be described in more detail below. Preferably, projection 49 is 180 degrees removed from projection 52, although the projections may be aligned or spaced as desired. As shown in FIG. 1, a rod 40 may be inserted into the handle 42 on each side of the handle with threads 41 or other attachment means. Such means may be used to manually rotate the male member when it is inserted into the female member. Other means for rotation may be used, such as mechanical means or cams.

Figure 2:
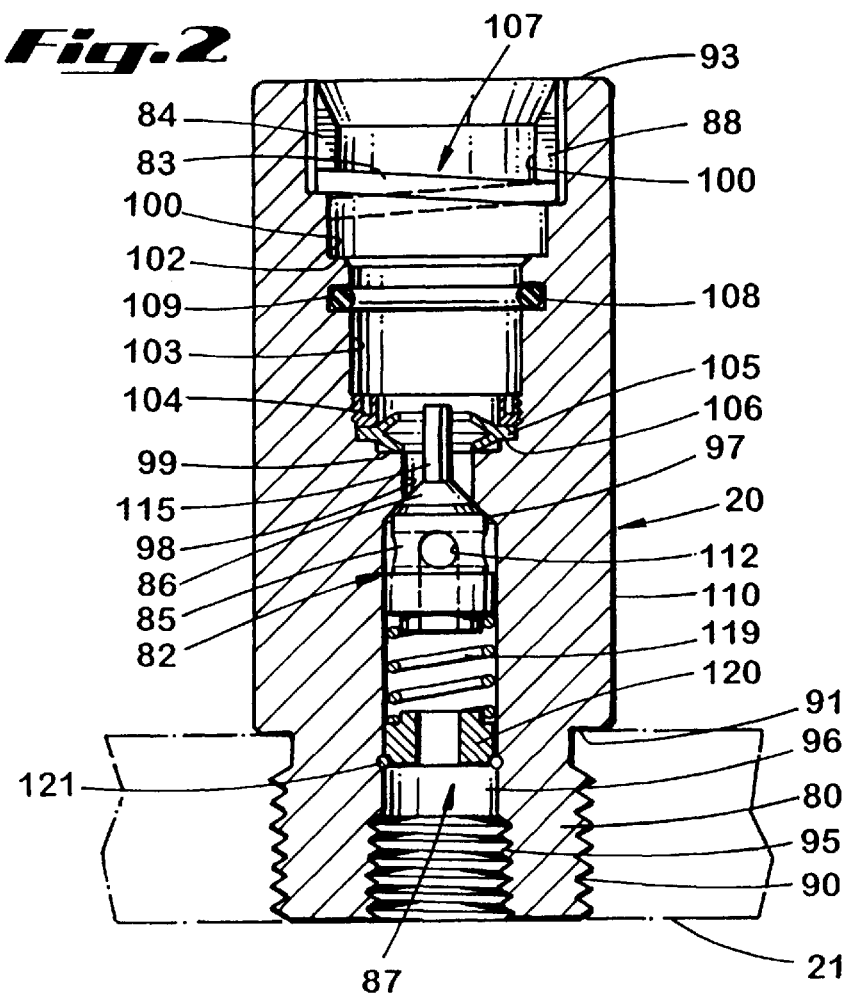
FIG. 2 is a section view of a female member of a coupling in a preferred embodiment of the invention.

Now turning to FIG. 2, a preferred embodiment of the female member of the present invention is shown. The female member 20 is attached to a manifold plate 21 so as to face the male member and align with it. The female member may be attached to the manifold plate using various means, such as set screws or threads. Techniques for attaching the member to a manifold plate are well known to those skilled in the art. The female member 20 comprises a handle 80, central bore 87 and a valve assembly 82. The handle 80 is optionally threaded to the manifold plate with threads 90. The female member also includes a shoulder 91 which is adjacent the threaded portion of the handle are the main cylindrical body 110, which terminates at female member face 93.

Central bore 87 has several variations in its diameter, as it extends through the body of the female member 20. At a first or outer end of the central bore is a threaded internal passageway 95 for connection to a threaded hydraulic line. The threaded portion 95 of the central bore terminates at cylindrical passageway 96 slidably receiving valve assembly 82. Cylindrical passageway 96 terminates internally at valve seat 97 for seating the valve face 86. Inboard of the valve seat 97 is narrowed bore 98.

The valve assembly 82 of the female member is substantially similar to the valve assembly of the male member and comprises a hollow valve body or head 85, with apertures 112 extending therethrough. Adjacent the cylindrical body is valve face 86 which is generally conical in shape for seating at the valve seat 97. Valve actuator 115 extends from the apex of the conical valve face and extends through passageway 98. To urge the female member valve assembly into the closed position, a helical valve spring 119 is mounted between the shoulder of the valve head 85 and spring collar 120 having collar clip 121 within passageway 96. The valve assembly 82 of the female member and valve assembly 61 of the male member are generally identical in components and function. When each valve is an open position wherein the mutually opposed faces of the valve actuators 65 and 115 are in contact with each other, the helical valve springs exert insufficient force to keep the check valves in the closed position. The passageways for fluid communication between the male and female members then open to allow fluid flow between the members.

The female member, as shown in FIG. 2, further comprises a receiving chamber 107 configured to receive the male member therein. In a preferred embodiment, the receiving chamber 107 includes several variations in its diameter. Adjacent the face 93 of the female member, the first end 100 of the receiving chamber has its largest diameter. Positioned on each side of the first end 100 of the receiving chamber are axially slots 84 and 88 configured to receive the radial projections 49 and 52 of the male member. Slots 84 and 88 extend between the channel 83 in the female member and the face 93. Projections 49 and 52, as well as the groove 83 may be the same or similar to an interrupted stub acme type thread. The receiving chamber 107 further includes a shoulder 102 and a second diameter 103 which is preferably narrower than the first diameter 100. In a preferred embodiment, the second section 103 includes a circumferential groove 109 for receiving a seal therein, which preferably is an elastomeric 0-ring 108. This seal serves as a back up seal to the metal seal 106 as will be described below.

The receiving chamber further includes shoulders 99 and 106 for annular ring-shaped seal 105. Annular seal 105 preferably is metal seal having a V-shaped cross section which is axially compressible. As shown in FIG. 2, one leg of the V-shaped seal seats against shoulder 99 and the opposing leg is configured to seal against the leading face 45 of the male member. In a preferred embodiment, the seal is retained in the female member bore with use of retainer 104 which optionally may be threaded to the second diameter 103 of the female member receiving chamber. However, other means of retaining the seal in the female bore may be used, such as a lock ring captured in an internal groove in the receiving chamber.

Although a metal seal with a V-shaped cross section is shown in a preferred embodiment, it will be recognized to those skilled in the art that other types of axially compressible seals may be used. For example, a C-ring seal may be used to seal axially by compression against the face 45 of the male member, or against another surface such as a shoulder on the male member body. Alternatively, elastomeric seals may be used to seal against the leading face of the male member. The seal should be compressible axially to enhance its sealing effect. Therefore, seals having an internal cavity which may be pressure energized and compressible axially are preferred.

Now referring to FIG. 3, the male member is shown partially inserted into the female member according to a preferred embodiment of the present invention. In FIG. 3, radial projection or fin 49 has been fully inserted down axial slot 84 and radial projection or fin 52 has been inserted down slot 88. At this point, the male member may be rotated 90 degrees while the projections 49 and 52 are within groove 83. In FIG. 3, the end of the male member, leading face 45, has touched seal 105.

Now referring to FIG. 4, the male member has been rotated 90 degrees while projections 49 and 52 are within groove 83. At this point, the leading face 45 of the male member has compressed the seal 105 axially to preload the seal. The seal is compressed between the leading face 45 of the male member and the shoulder 99 in the female receiving bore.

In FIG. 5, a cross section of the male and female members is shown is the same position as FIG. 3. Prior to rotation of the male member, projection 49 is within slot 84, and projection 52 is within slot 88. At this point, the male member may be rotated with both projections in groove 83. In FIG. 6, the members have been rotated 90 degrees relative to each other. This locks the male member to the female member, and axially compresses the seal 105 as described above.

In FIG. 7, a perspective view of the male and female members is shown. The male member 10 may be inserted into the female member receiving chamber 107 so that fins or radial projections 49 and 52 align with slots 84 and 88, respectively. Then, when the projections reach groove 83, the male member may be rotated to secure it to the female member and axially compress seal 105.

Although variations in the embodiment of present invention may not each realize all of the advantages of the invention, certain features may become more important than others in various applications of the device. The invention, accordingly, should be understood to be limited only by the scope of the appended claims.

What is claimed is:

1. A valved hydraulic coupling comprising:
   a female member having a cylindrical receiving chamber with a first end and an internal circumferential shoulder, a helical groove in the receiving chamber, and a pair of slots extending from the first end of the receiving chamber to the helical groove;
   an axially compressible hollow ring-shaped metal seal positioned on the internal circumferential shoulder;
   a seal retainer connected to the female member for holding the metal seal in place;
   a male member having a cylindrical body with a leading face, and a pair of projections extending radially outwardly from the body, the projections dimensioned to slide axially within the pair of slots in the receiving chamber and the cylindrical body dimensioned to slide axially into the receiving chamber until the projections reach the helical groove, the male member rotatable ninety degrees with respect to the female member when the projections are in the helical groove, the rotation urging the male member further into the receiving chamber and the leading face against the seal to axially compress the seal.

2. A hydraulic coupling comprising:
   a male member having a leading face, a cylindrical body, an internal bore extending therethrough, a slidable valve to control fluid flow through the bore, and projections extending radially outwardly from the cylindrical body; and
   a female member having a body, two ends, a cylindrical bore extending therethrough and a shoulder intermediate the bore, a slidable valve to control fluid flow through the bore, at least a portion of the bore dimensioned to slidably receive the male member body therein and having a hollow metal ring-shaped seal retained adjacent the shoulder and engageable with the male member leading face, the seal having a cavity exposed to fluid pressure in the coupling, a channel in the bore extending at least partially around the bore along a helical path, the channel dimensioned to receive each of the projections therein, the male member body rotatable a maximum of ninety degrees with respect to the female member body whereby the seal is axially compressed between the male member leading face and the shoulder to compress the cavity of the seal, and slots inside the bore communicating between the channel and one end of the female member body, each of the slots dimensioned to allow insertion of the projections from the end of the female member body to the channel, and
   a seal retainer engageable with the female member and configured to hold the seal in place upon separation of the male and female members.

3. The hydraulic coupling of claim 2 wherein the seal is V-shaped in cross-section.

4. The hydraulic coupling of claim 3 wherein each of the projections extend at least partially around the male member body along a helical path.

5. The hydraulic coupling of claim 4 wherein the slidable valves in the male and female members are poppet valves biased to the closed position and openable upon mutual engagement of valve actuators extending from the poppet valves.

6. A hydraulic coupling comprising:
   (a) a female member having first and second ends, a bore with a normally closed valve for controlling the flow of hydraulic fluid between the first and second ends, a shoulder intermediate the bore, a groove extending at least partially around the central bore in a generally helical direction, and passages inside the bore from the groove to the first end of the female member;
   (b) a male member dimensioned to be slidably inserted into the female member bore, the male member having a bore with a normally closed valve for controlling the flow of hydraulic fluid therethrough, and fins projecting radially outwardly from the male member and dimensioned to be insertable into each of the passages; and
   (c) a hollow metal ring-shaped seal retained against the shoulder in the female member bore, the seal being axially compressible between the male member and the shoulder when the fins of the male member are fully inserted into each of the passages until they reach the groove and the male member is rotated a maximum of ninety degrees with respect to the female member; and
   (d) a retainer engageable with the female member for holding the seal in the female member bore upon separation of the male and female members.

7. The hydraulic coupling of claim 6 further comprising a circumferential shoulder in the female member bore for limiting the axial movement of the male member into the female member bore.

8. The hydraulic coupling of claim 6 wherein the male member contacts the seal when it is inserted into the female member bore, and the groove in the female member bore is configured to limit the rotation of the male member to ninety degrees at which time the seal is compressed axially sufficiently to form a fluid tight seal between the male and female members.

9. A hydraulic coupling comprising:
(a) a valved male member having a leading face, a stepped body with a plurality of external circumferential steps progressively smaller in diameter from a first end to a second end thereof, and fins projecting radially from the body;
(b) a valved female member having first and second ends, a stepped receiving chamber having a plurality of internal circumferential steps extending from the first end into the female member, the receiving chamber dimensioned to receive the male member body therein, the receiving chamber having a helical groove therein and a pair of slots extending axially inside the receiving chamber between the groove and the first end of the female member;
(c) an annular hollow metal seal and a seal retainer for retaining the seal against one of the steps in the receiving chamber, the seal being axially compressible between the male member leading face and stepped receiving chamber when the male member is rotated a maximum of ninety degrees to cam the male member further into the stepped receiving chamber.

10. The hydraulic coupling of claim 9 wherein the seal is a V-shaped in cross-section.

11. The hydraulic coupling of claim 10 further comprising a seal retainer removably attached to the receiving chamber for retaining the seal adjacent one of the steps in the receiving chamber upon removal of the male member body therefrom.

12. The hydraulic coupling of claim 11 further comprising a second seal in the receiving chamber engageable with the male member body.

13. The hydraulic coupling of claim 12 wherein one of the first and second seals is engageable with the second end of the male member body and the other seal is engageable radially around the circumference of the male member body.

14. The hydraulic coupling of claim 13 wherein the seal is pressure energized whereby fluid pressure in the coupling urges the seal to expand against the male member body and the receiving chamber.

* * * * *

UNITED STATES PATENT AND TRADEMARK OFFICE
CERTIFICATE OF CORRECTION

PATENT NO. : 6,173,742
DATED : January 16, 2001
INVENTOR(S) : Smith, III

It is certified that error appears in the above-identified patent and said Letters Patent is hereby corrected as shown below:

Title page,
Item [52], U.S. Cl., please delete 137/614.04" and insert -- 137/614.000 -- therefor.

Column 6,
Line 27, please delete "claim 3," and insert -- claim 2, -- therefor.
Line 30, please delete "claim 4," and insert -- claim 2, -- therefor.

Column 8,
Line 6, please delete "claim 10," and insert -- claim 9, -- therefor.
Line 11, please delete "claim 11," and insert -- claim 9, -- therefor.
Line 14, please delete "claim 12," and insert -- claim 9, -- therefor.
Line 18, please delete "claim 13," and insert -- claim 9, -- therefor.

Signed and Sealed this

Fourteenth Day of August, 2001

*Attest:*

Nicholas P. Godici

*Attesting Officer*

NICHOLAS P. GODICI
*Acting Director of the United States Patent and Trademark Office*